April 20, 1965     D. B. KIRK     3,178,931

PNEUMATIC MEASURING APPARATUS

Filed April 13, 1961

INVENTOR.
DAVID B. KIRK

BY

ATTORNEY 3,178,931
PNEUMATIC MEASURING APPARATUS
David B. Kirk, Oreland, Pa., assignor to Moore Products
Co., Philadelphia, Pa., a corporation of Pennsylvania
Filed Apr. 13, 1961, Ser. No. 102,798
4 Claims. (Cl. 73—37.5)

This invention relates to pneumatic measuring apparatus and more particularly to improvements in such apparatus by which an appreciable amount of dead time is eliminated so that the overall measuring time is decreased.

Pneumatic gages have heretofore been proposed operating upon the principle that if a fluid under constant pressure is forced through upstream and downstream orifices in series with one another, the gaseous pressure in the space between the orifices will be a function of the relative sections of the orifices and the measurement of the gaseous pressure in the space will indicate the effective area of the discharge or downstream orifice as varied by the position of the work with respect thereto within certain limits.

It has been recognized that the volume of the space between the two orifices should be kept small to reduce the time required for the pressure to build up and become stable at an equilibrium value. The present invention is particularly suitable for reducing the time required to attain equilibrium by maintaining the pressure in the space at a predetermined level which is preferably close to but below the gaging pressure range.

In accordance with the present invention, a simple but effective structure is provided for increasing the speed of operation of pneumatic measuring apparatus by shortening the time required for obtaining equilibrium as determined by the dimensions of the workpiece being gaged.

In accordance with the present invention also, and in order to increase the speed of operation, a simple but effective pressure hold up relay is provided interposed in the gaging circuit and close to the gage plug in which the downstream orifice is located so as to retain the pressure in the space and which is measured at a predetermined higher level than that normally permitted by free flow through the downstream or discharge orifice in the gaging head.

In accordance with the present invention, also, a pressure holdup relay is provided responsive to upstream and downstream pressures and capable of adjustment for shutting off the discharge through the gaging nozzle at predetermined pressure levels, preferably below the gaging pressure range.

In accordance with the present invention, also, improvements are provided in gaging circuits which are particularly useful in connection with the control of automatic machinery, including grinders and the like, as determined by measurements made from time to time of the work in progress.

In accordance with the present invention, also, improvements are provided in pneumatic measuring circuits by which an increased speed of response within the gaging pressure range is made available between successive gaging operations.

In accordance with the present invention, also, improvements are provided in pneumatic measuring circuits by which the amount of air required is reduced.

In accordance with the present invention, also, improvements are provided in pneumatic measuring apparatus which are simple in construction, reliable in operation, compact and easily installed in existing gaging circuits.

Other objects and advantageous features of the invention will be apparent from the description and claims.

The nature and characteristic features of the invention will be more readily understood from the following description, taken in connection with the accompanying drawings forming part thereof, in which.

Figure 1:
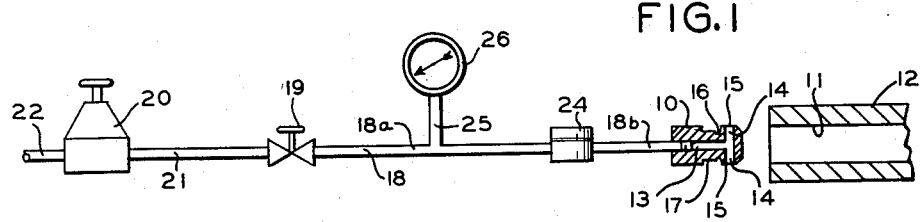
FIGURE 1 is a diagrammatic view of a gaging circuit in accordance with the present invention.

It should, of course, be understood that the description and drawings are illustrative merely, and that various modifications and changes can be made in the structure disclosed without departing from the spirit of the invention.

Like numerals refer to like parts throughout the several views.

Referring now more particularly to the drawings, a gage plug of a well known type is shown at 10 suitable for gaging the internal condition of a bore or opening 11 in the workpiece 12. The gage plug 10, shown merely way of illustration, has an interior fluid delivery passageway 13 and branch passageways 14 providing opposed gaging nozzles with nozzle openings terminating at outer surfaces 15 which may be below the exterior surface of the gage plug 10. Circular grooves 16 and escape slots 17 may be provided on the gage plug 10 to permit of free escape of the gaging fluid when the gage plug 10 is within the workpiece 12.

The passageway 13 is in communication through a pipe 18 with an adjustable upstream restriction or orifice 19 to which the output side of an adjustable pressure regulator 20 is connected by a fluid connection 21. The input side of the pressure regulator 20 is connected by a fluid connection 22 to any suitable source of fluid, preferably filtered air, under pressure.

The pressure regulator 20, by suitable adjustment, determines the pressure of the fluid supplied to the restriction 19 and therethrough to the pipe 18, and with the restriction 19, determines the gaging pressure range.

Interposed in the pipe 18, and between upstream and downstream portions 18a and 18b thereof and preferably as close as feasible to the gage plug 10, a pressure holdup relay 24 is provided. The upstream portion 18a of the pipe 18 between the relay 24 and the upstream restriction 19 has a fluid connection 25 connected thereto for transfer of the pressure at that location to any suitable pressure responsive device for indication, recording or control, a dial type pressure gage 26 being shown merely by way of illustration.

Figure 2:
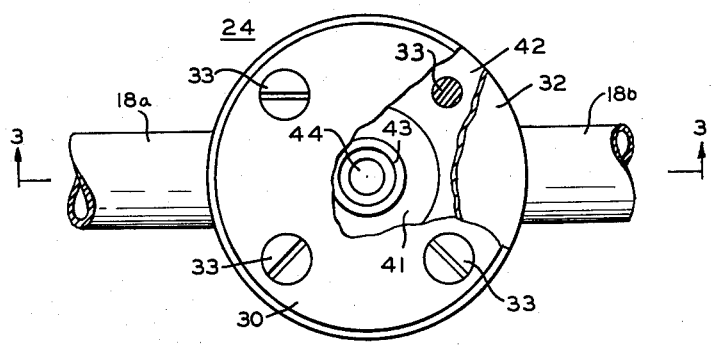
FIG. 2 is a top plan view, enlarged, of a preferred form of holdup relay employed in connection with the invention, parts being broken away to show the interior construction.
Figure 3:
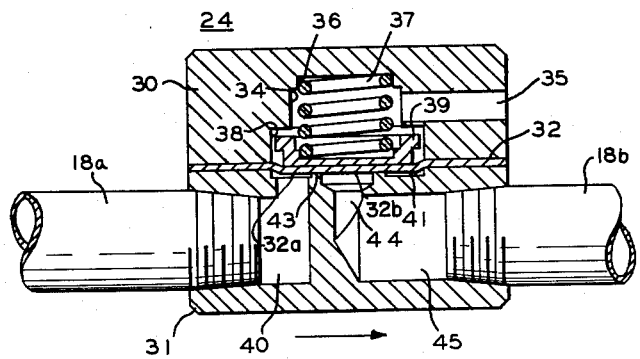
FIG. 3 is a central sectional view taken approximately on the line 3—3 of FIG. 2.

The pressure holdup relay 24 shown in more detail in FIGS. 2 and 3, preferably includes a first housing section 30 and a second housing section 31, shown respectively as upper and lower sections, with a diaphragm 32 interposed therebetween. The diaphragm 32 can be of any preferred impervious material, synthetic rubber, such as neoprene being suitable. The housing sections 30 and 31 are held together in any desired manner, such as by studs 33. The relay 24 is not critical as to its orientation.

The first housing section 30 has a bore 34 therein communicating with the atmosphere through a vent opening 35. The bore 34 has a section 36 of reduced diameter serving as a spring seat for a spring 37 and an enlarged section 38 for the reception of a diaphragm seating plate 39 which is freely movable in the bore section 38, which bears on the diaphragm 32 and which has the opposite end of the spring 37 seated therein. The spring 37 can have any desired spring rate but preferably exerts a force sufficient to effect almost complete closing movement of the plate 39 under predetermined pressure conditions as hereinafter explained.

The second housing section 31 has a fluid connection 40 to which the pipe 18 is connected.

The fluid connection 40 is in communication with an annular groove 41 providing a chamber in the face 42 of the housing section 31 contiguous to the diaphragm 32, the groove being in surrounding relation to a flat nozzle terminal seat 43. The seat 43 has a central nozzle opening 44 extending therefrom and in communication with a fluid connection 45 to which the pipe 18 is connected. The diaphragm 32 has a surface portion or area 32a surrounding the seat 43 exposed to the upstream pressure and a surface portion or area 32b within the seat 43 exposed to the downstream pressure.

As previously indicated, the relay 24 is preferably connected close to the gage plug 10 so that the major volume is upstream with respect to the fluid connection 40.

The mode of operation will now be pointed out.

Assuming that air is being supplied through the pressure regulator 20, through the restriction 19 and the pipe 18 to and through the relay 24, if the gage plug 10 has its openings in free communications with the atmosphere, the downstream pressure effective on the underside of the diaphragm 32 at the opening 44 is effective on an area corresponding to that of the opening 44 and is substantially atmospheric. The diaphragm 32 is impelled downwardly by the spring 37 in engagement with the plate 39 which bears on the diaphragm 32, and in opposition to the upstream pressure effective at the groove 41 on the underside of the diaphragm 32 and on an area corresponding to the flat area of the groove 41. The diaphragm 32 is thus positioned to reduce the discharge through the opening 44 to a very small amount. The discharge of gaging fluid is accordingly greatly reduced. The spring 37 is preferably selected so that when the nozzles in the gage plug 10 are wide open, the pressure upstream with respect to the relay 24 is less than the pressure in the gaging or measuring range, but is available to be increased and is close to the lower limit of the gaging or measuring range so that only a small increase and accordingly only a short time interval are required to raise it to the gaging range.

If now the gage plug 10 is inserted into a workpiece 12 for obtaining a measurement, the downstream pressure in the relay 24 will increase and will be effective on the under side of the diaphragm 32. The pressure acting on the two areas 32a and 32b aid in raising the diaphragm 32 and holding it well off its seat 43, thereby permitting the flow of gaging fluid to the gaging plug 10 and building up of pressure effective at the pressure responsive indicator 26 and within the gaging range.

If the gage plug 10 is withdrawn from measuring relation to the workpiece 12 so that free discharge from the gage plug is again effective, the force of the spring 37 is effective for again reducing the discharge past the seat 43 while maintaining the upstream pressure with respect to the relay 24 at a predetermined level below the gaging range.

I claim:
1. In measuring apparatus having a source of fluid under pressure, a fluid pressure regulator connected to said source, a gage member, a fluid connection between said fluid pressure regulator and said gage member, flow limiting means between said regulator and said gage member, said gage member having a discharge opening controlled by a dimension of the work to be measured, a relay interposed in said fluid connection between said flow limiting device and said gage member and having an inlet connection connected to said flow limiting device and an outlet connection connected to said gage member, said relay having portions for retaining in said fluid connection upstream of said relay an elevated pressure level when said discharge opening is unrestricted, and a pressure output connection connected to said fluid connection between said flow limiting means and said relay.

2. In measuring apparatus having a source of fluid under pressure, a fluid pressure regulator connected to said source, a gage member, a fluid connection between said fluid pressure regulator and said gage member, flow limiting means between said regulator and said gage member, said gage member having a discharge opening controlled by a dimension of the work to be measured, a relay interposed in said fluid connection between said flow limiting device and said gage member for retaining in said fluid connection upstream of said relay an elevated pressure outside the gaging range when said discharge opening is unrestricted, said relay having an inlet connection connected to said flow limiting device and an outlet connection connected to said gage member, said relay having a movable member bounding a chamber communicating through said inlet connection with said fluid connection upstream of said relay, a nozzle containing a passageway one end of which opens into said chamber and the other end of which communicates through said outlet connection with said gage member, said movable member being movable with respect to said nozzle and a resilient member for impelling said movable member toward said nozzle, and a pressure output connection connected to said fluid connection between said flow limiting means and said relay.

3. In a measuring apparatus having a source of fluid under pressure, a fluid pressure regulator connected to said source, a gage member, a fluid connection between said fluid pressure regulator and said gage member, flow limiting means between said regulator and said gage member, said gage member having a discharge opening controlled by a dimension of the work to be measured, a relay interposed in said fluid connection between said flow limiting means and said gage member for retaining in said fluid connection upstream of said relay an elevated pressure outside the gaging range when said discharge opening is unrestricted, said relay having a movable member bounding a chamber communicating through said inlet connection with said fluid connection upstream of said relay a nozzle containing a passageway one end of which opens into said chamber and the other end of which communicates through said outlet connection with said gage member, a resilient member for impelling said movable member toward said nozzle, said movable member having a surface portion in said chamber continuously exposed to the pressure in said fluid connection upstream of said relay and a portion exposed to the pressure downstream of said relay, and a pressure output connection to said fluid connection between said flow limiting means and said relay.

4. In measuring apparatus having a source of fluid under pressure, a fluid pressure regulator connected to said source, a gage member, a fluid connection between said fluid pressure regulator and said gage member, flow limiting means between said regulator and said gage member, said gage member having a discharge opening controlled by a dimension of the work to be measured, a pressure responsive device interposed in said fluid connection between said flow limiting device and said gage member, said pressure responsive device being responsive over a predetermined range of measuring conditions at said discharge opening, and a relay interposed in said fluid connection between said pressure responsive device and said gage member, said relay having portions for retaining in said pressure responsive device an elevated pressure level slightly below said predetermined range when said discharge opening is unrestricted.

References Cited by the Examiner
UNITED STATES PATENTS

| | | | |
|---|---|---|---|
| 2,841,006 | 7/58 | Baker | 73—37.9 |
| 2,845,792 | 8/58 | Eisenhardt | 73—37.9 |
| 2,889,704 | 6/59 | Baker | 73—37.9 |

ISAAC LISANN, *Primary Examiner.*